US010132664B2

(12) United States Patent
Jones

(10) Patent No.: US 10,132,664 B2
(45) Date of Patent: Nov. 20, 2018

(54) ADJUSTABLE FLOW METER SYSTEM

(71) Applicant: Daniel Measurement and Control, Inc., Houston, TX (US)

(72) Inventor: David Lelan Jones, Marshalltown, IA (US)

(73) Assignee: Daniel Measurement and Control, Inc., Houston, TX (US)

( * ) Notice: Subject to any disclaimer, the term of this patent is extended or adjusted under 35 U.S.C. 154(b) by 50 days.

(21) Appl. No.: 15/336,426

(22) Filed: Oct. 27, 2016

(65) Prior Publication Data

US 2018/0120137 A1    May 3, 2018

(51) Int. Cl.
*G01F 1/44* (2006.01)
*G01F 15/18* (2006.01)

(52) U.S. Cl.
CPC ............. *G01F 1/44* (2013.01); *G01F 15/185* (2013.01)

(58) Field of Classification Search
CPC .............. G01F 1/44; G01F 1/74; G01F 1/84
See application file for complete search history.

(56) References Cited

U.S. PATENT DOCUMENTS

| 3,733,901 | A | | 5/1973 | Halmi | |
|---|---|---|---|---|---|
| 3,889,537 | A | * | 6/1975 | Khuzaie | G01F 1/44 73/861.64 |
| 5,533,549 | A | * | 7/1996 | Sherman | F16K 27/067 137/556.6 |
| 8,061,219 | B2 | * | 11/2011 | Rezgui | G01F 1/44 73/861.63 |
| 8,065,923 | B2 | * | 11/2011 | Duhanyan | G01F 1/74 73/861.04 |
| 8,826,745 | B2 | * | 9/2014 | Van Cleve | G01F 1/8413 73/54.41 |
| 8,984,959 | B2 | * | 3/2015 | Hutchinson | G01N 27/226 73/861.04 |
| 2002/0002425 | A1 | * | 1/2002 | Dossey | G01F 1/44 700/284 |
| 2002/0178837 | A1 | | 12/2002 | Brandt | |
| 2003/0136196 | A1 | | 7/2003 | Wiklund et al. | |
| 2011/0185805 | A1 | | 8/2011 | Roux et al. | |

FOREIGN PATENT DOCUMENTS

WO    2012097194 A1    7/2012

OTHER PUBLICATIONS

International Search Report and Written Opinion dated Feb. 19, 2018, for International Appliction No. PCT/US2017/058724 (16 pgs.).

* cited by examiner

*Primary Examiner* — Jewel V Dowtin
(74) *Attorney, Agent, or Firm* — Conley Rose, P.C.

(57) ABSTRACT

A flow meter assembly having a longitudinal axis includes an upstream member including a first end, a second end, and a fluid passageway extending between the first and second ends, a downstream member including a first end and a second end, and a first throat member including a first end, a second end, and a fluid passageway extending between the first and second ends, wherein the fluid passageway of the first throat member has a minimum diameter that is less than a minimum diameter of the fluid passageway of the upstream member, wherein the first throat member is configured to releasably couple to the upstream member and the downstream member.

19 Claims, 5 Drawing Sheets

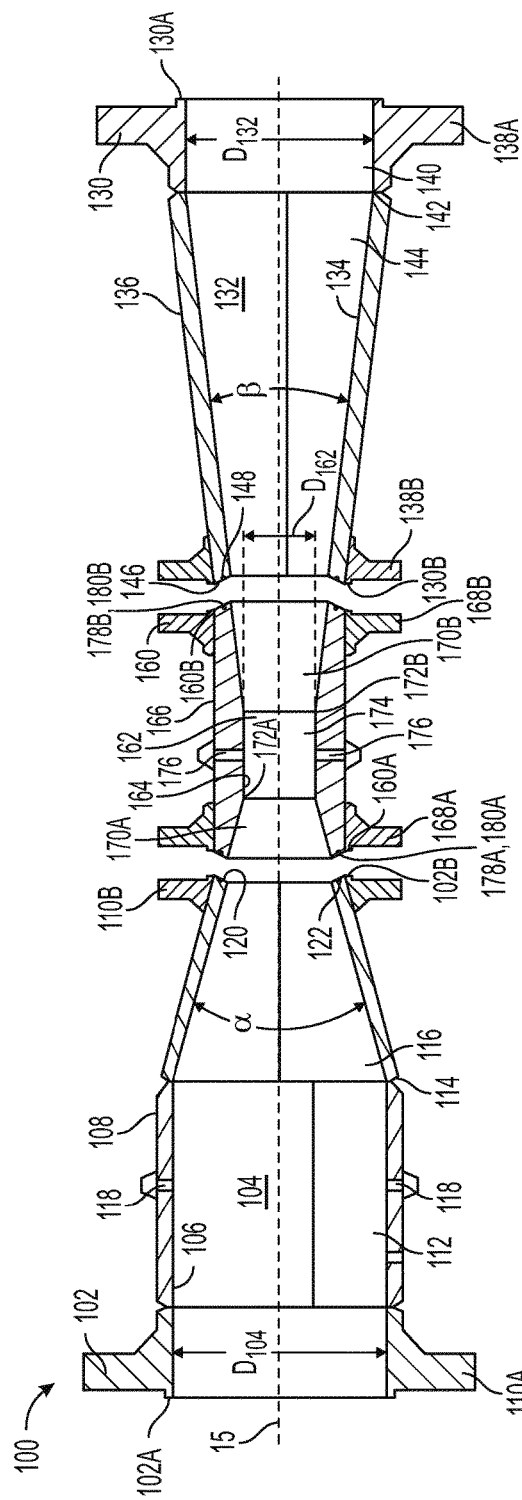
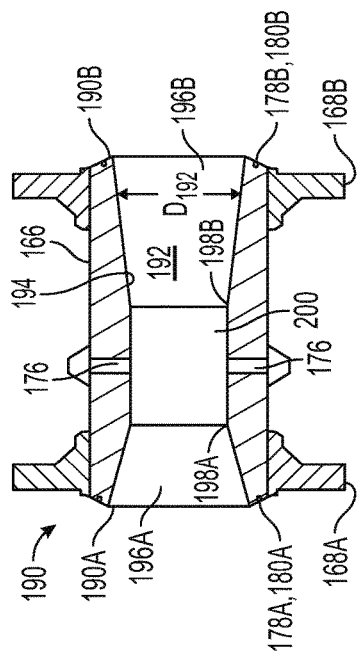
FIG. 2
FIG. 3

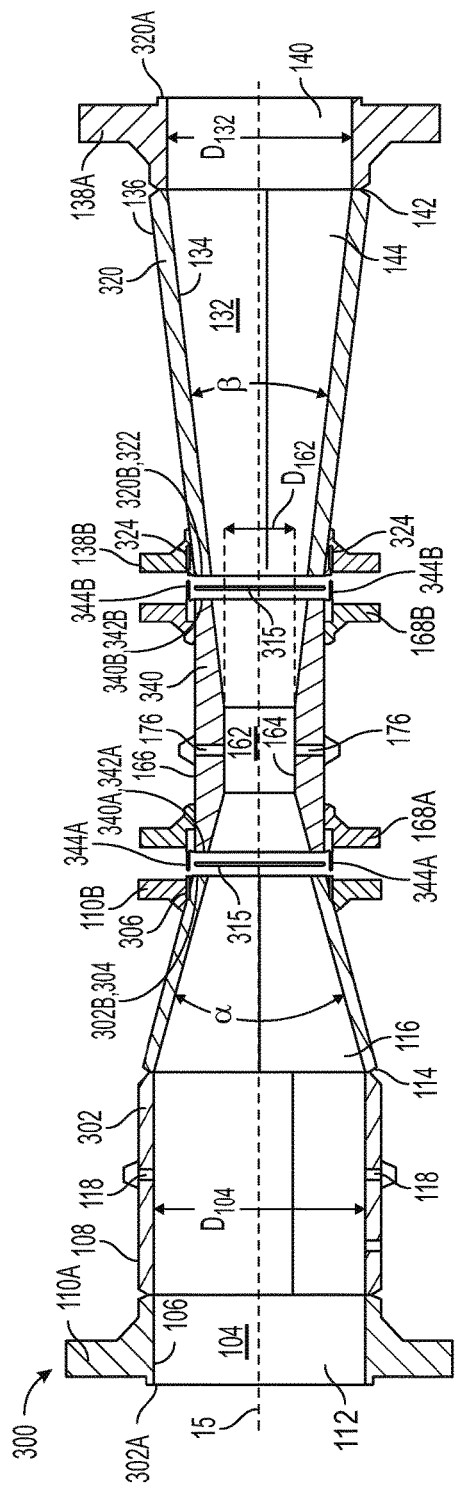
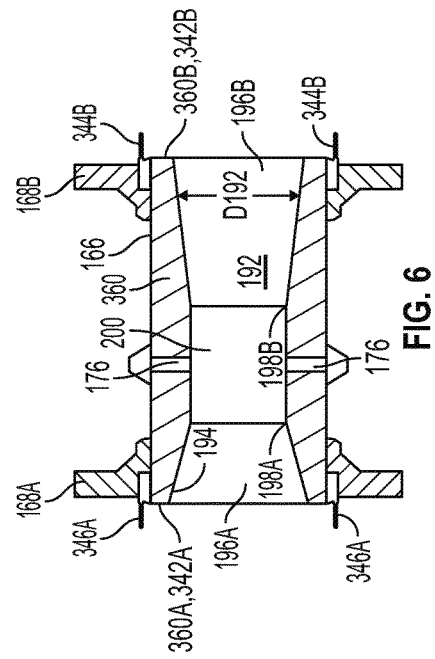
FIG. 5
FIG. 6

ADJUSTABLE FLOW METER SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Flow meters are used in fluid systems to measure the rate of fluid flow through fluid conduits. Flow meters may be used for measuring fluid flow in fluid pipeline systems, within wellbores of well or drilling systems, and in other industrial applications. A common type of flow meter used in industrial applications are venturi flow meters which create a restriction within the fluid flow path and measure the resulting pressure differential formed in the fluid flowing through the meter. Due to their resistance to erosion, venturi flow meters may be used in downhole or wellbore applications with abrasive fluids or slurries, or in applications including multiphase fluid flow. Additionally, venturi flow meters may be used in high fluid flow rate applications.

In some applications, venturi flow meters may include a reduced diameter section or "throat" that forms a restriction in the fluid passageway of the flow meter. In some applications, fluid pressure is measured within the throat of the flow meter and at a position upstream of the throat, where the fluid pressure within the throat is decreased versus the upstream section due to an increase in the rate of fluid flow through the throat according to the Bernoulli principle. By comparing the difference in measured fluid pressure between the throat and the upstream section with the ratio of inner diameters of the throat and upstream section (known as the "beta ratio" of the flow meter), the rate of fluid flow through the flow meter may be inferred through well-known equations.

In some applications, the venturi flow meter is designed with a predetermined beta ratio configured to provide accurate fluid flow rate measurements within a predetermined fluid flow rate range. In other words, a venturi flow meter's beta ratio may only provide accurate flow rate measurement within a corresponding flow rate range, where deviation from the particular flow rate range by the flowing fluid may result in inaccurate or imprecise measurement of the fluid flow rate by the meter, limiting the flexibility of the meter in measuring the rate of fluid flow therethrough.

SUMMARY

An embodiment of a flow meter assembly having a longitudinal axis comprises an upstream member comprising a first end, a second end, and a fluid passageway extending between the first and second ends, a downstream member comprising a first end and a second end, and a first throat member comprising a first end, a second end, and a fluid passageway extending between the first and second ends, wherein the fluid passageway of the first throat member has a minimum diameter that is less than a minimum diameter of the fluid passageway of the upstream member, wherein the first throat member is configured to releasably couple to the upstream member and the downstream member. In some embodiments, the first end of the first throat member is configured to releasably couple with the second end of the upstream member and the second end of the first throat member is configured to releasably couple with the second end of the downstream member. In some embodiments, when the first throat member is releasably coupled to the upstream member and the downstream member, the flow meter assembly comprises a first beta ratio comprising the minimum diameter of the fluid passageway of the first throat member divided by a maximum diameter of the fluid passageway of the upstream member. In certain embodiments, the flow meter assembly further comprises a second throat member configured to releasably couple to the upstream member and downstream member and comprising a first end, a second end, and a fluid passageway extending between the first and second ends, wherein the fluid passageway of the second throat member has a minimum diameter that is less than the minimum diameter of the fluid passageway of the first throat member. In certain embodiments, when the second throat member is releasably coupled to the upstream member and the downstream member, the flow meter assembly comprises a second beta ratio comprising the minimum diameter of the fluid passageway of the second throat member divided by the maximum diameter of the fluid passageway of the upstream member, and wherein the second beta ratio is different from the first beta ratio. In some embodiments, the second end of the upstream member comprises an angled engagement surface and the first end of the first throat member comprises an angled engagement interface, and engagement between the engagement surface of the upstream member with the engagement surface of the first throat member is configured to axially align the upstream member with the first throat member. In certain embodiments, the angled engagement surfaces of the upstream member and the first throat member each comprise conical engagement surfaces, and the engagement surface of the first throat member is configured to be inserted into the second end of the upstream member. In certain embodiments, the first end of the first throat member comprises an annular flange, the second end of the upstream member comprises an annular flange, and the flow meter assembly further comprises a plurality of threaded fasteners extending between the flanges of the upstream member and the first throat member to couple the upstream member with the throat member.

An embodiment of a flow meter assembly having a longitudinal axis comprises an upstream member comprising a first end, a second end, and a fluid passageway extending between the first and second ends, a downstream member comprising a first end and a second end, and a throat member comprising a first end, a second end, and a fluid passageway extending between the first and second ends, wherein the throat member is configured to provide a restriction in a fluid flow passing through the flow meter assembly, wherein the throat member is removably coupled to the upstream member and the downstream member. In some embodiments, the flow meter assembly comprises a first beta ratio comprising a minimum diameter of the fluid passageway of the throat member divided by a maximum diameter of the fluid passageway of the upstream member. In some embodiments, the first end of the throat member comprises an annular flange, the second end of the upstream member comprises an annular flange, and the flow meter assembly further comprises a plurality of threaded fasteners extending between the flanges of the upstream member and the throat member to couple the upstream member with the throat member. In certain embodiments, the first end of the throat member comprises an alignment pin, and the second end of the upstream member comprises an alignment receptacle configured to receive the alignment pin of the throat member to axially align the upstream member with the throat member. In certain embodiments, the second end of the upstream member comprises an engagement surface and the first end of the throat member comprises an engagement interface configured to engage the engagement surface of the upstream member, and the engagement surfaces of the upstream member and the throat member each comprise an annular groove configured to receive an annular seal to seal an interface between the upstream member and the throat member. In some embodiments, the second end of the upstream member comprises an engagement surface and the first end of the throat member comprises an engagement interface configured to engage the engagement surface of the upstream member, and the flow meter assembly further comprises a gasket disposed axially between the upstream member and the throat member to seal an interface between the upstream member and the throat member. In some embodiments, the fluid passageway of the first throat member has a minimum diameter that is less than a minimum diameter of the fluid passageway of the upstream member.

An embodiment of a method of measuring a rate of fluid flow using a flow meter comprises coupling a first throat member to an upstream member of a flow meter and a downstream member of a flow meter to provide the flow meter with a first beta ratio, measuring a first flow rate of a fluid flow through the flow meter, removing the first throat member from the flow meter, and coupling a second throat member to the upstream member of the flow meter and the downstream member of the flow meter to provide the flow meter with a second beta ratio that is different than the first beta ratio. In some embodiments, the method further comprises measuring a second flow rate of the fluid flow through the flow meter after the second throat member is coupled to the upstream member of the flow meter, wherein the first flow rate is within a first flow rate range and the second flow rate is within a second flow rate range that is different from the first flow rate range. In some embodiments, the method further comprises engaging an angled engagement surface of the first throat member with an angled engagement surface of the upstream member to axially align the upstream member with the first throat member. In certain embodiments, the method further comprises extending a threaded fastener through a flange of the upstream member and a flange of the first throat member to releasably couple the upstream member with first throat member. In certain embodiments, the method further comprises extending an alignment pin of the first throat member into an alignment aperture of the upstream member to axially align the upstream member with the first throat member.

BRIEF DESCRIPTION OF THE DRAWINGS

The subject disclosure is further described in the following detailed description, and the accompanying drawings and schematics of non-limiting embodiments of the subject disclosure. The features depicted in the figures are not necessarily shown to scale. Certain features of the embodiments may be shown exaggerated in scale or in somewhat schematic form, and some details of elements may not be shown in the interest of clarity and conciseness:

FIG. 2 is a cross-sectional view of an embodiment of a flow meter body assembly of the flow meter system of FIG. 1 in accordance with principles disclosed herein;

FIG. 3 is a cross-sectional view of an embodiment of an interchangeable throat of the flow meter body assembly of FIG. 2 in accordance with principles disclosed herein;

FIG. 5 is a cross-sectional view of another embodiment of a flow meter body assembly of the flow meter system of FIG. 1 in accordance with principles disclosed herein;

FIG. 6 is a cross-sectional view of another embodiment of an interchangeable throat of the flow meter body assembly of FIG. 5 in accordance with principles disclosed herein.

DETAILED DESCRIPTION

Figure 1:
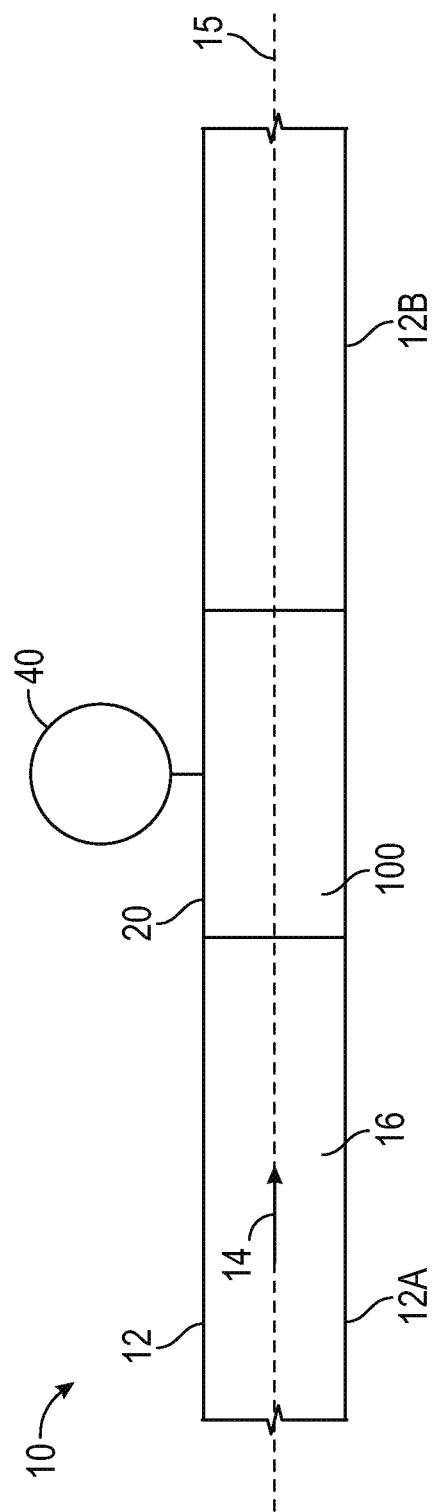
FIG. 1 is a schematic view of a flow meter system in accordance with principles disclosed herein.

In the drawings and description that follow, like parts are typically marked throughout the specification and drawings with the same reference numerals. The drawing figures are not necessarily to scale. Certain features of the disclosed embodiments may be shown exaggerated in scale or in somewhat schematic form and some details of conventional elements may not be shown in the interest of clarity and conciseness. The present disclosure is susceptible to embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed below may be employed separately or in any suitable combination to produce desired results.

Unless otherwise specified, in the following discussion and in the claims, the terms "including" and "comprising" are used in an open-ended fashion, and thus should be interpreted to mean "including, but not limited to . . . ". Any use of any form of the terms "connect", "engage", "couple", "attach", or any other term describing an interaction between elements is not meant to limit the interaction to direct interaction between the elements and may also include indirect interaction between the elements described. The various characteristics mentioned above, as well as other features and characteristics described in more detail below, will be readily apparent to those skilled in the art upon reading the following detailed description of the embodiments, and by referring to the accompanying drawings.

Referring to FIG. 1, an embodiment of a flow meter system 10 is shown schematically. Flow meter system 10 is generally configured to measure a rate of fluid flow through a fluid conduit. In the embodiment shown in FIG. 1, flow meter system 10 has a central or longitudinal axis 15 and generally includes a fluid conduit or pipe 12 and a flow meter 20. Particularly, flow meter 20 is coupled and disposed axially between an upstream section 12A and a downstream section 12B of the pipe 12, where a fluid flow 14 passes through a bore or fluid passageway 16 of the pipe 12 between the upstream section 12A and downstream section 12B. In some embodiments, pipe 12 may comprise a fluid pipeline for transporting fluids therethrough. In other embodiments, pipe 12 may comprise a tubular string disposed within a wellbore of a well system, such as a tubing string, casing string, coiled tubing, drill string, etc. In still other embodiments, flow meter 20 of flow meter system 10 may be incorporated in other fluid systems besides the flow meter system 10 shown in FIG. 1.

In the embodiment shown in FIG. 1, flow meter 20 includes a flow meter body assembly 100 and an electronics package or assembly 40 coupled to body assembly 100. Flow meter 20 of flow meter system 10 generally comprises a venturi flow meter configured to measure a rate of flow of fluid flow 14 as it passes through the body assembly 100 of flow meter 20 by producing a flow restriction in the fluid flow 14 and measuring the pressure differential resulting from the flow restriction. Electronics assembly 40 includes a plurality of pressure transducers or sensors configured to measure the pressure of the fluid flow 14 passing through body assembly 100 at predetermined axial and circumferential positions of body assembly 100. In the embodiment shown in FIG. 1, electronics assembly 40 additionally includes a processor and a memory configured to infer the fluid flow rate of fluid flow 14 from the pressure measurements performed by the pressure sensors of electronics assembly 40. In some embodiments, electronics assembly 40 may include a transmitter to transmit in real-time, either wirelessly or via a hard-wired connection, the flow rate measurement of fluid flow 14 provided by assembly 40.

Referring to FIG. 2, an embodiment of the flow meter body assembly 100 of the flow meter 20 of FIG. 1 is shown. In the embodiment shown in FIG. 2, body assembly 100 has a central or longitudinal axis coaxial with central axis 15 and generally includes a first or upstream tubular member 102, a second or downstream tubular member 130, and a first throat member 160 disposed axially between upstream member 102 and downstream member 130. Upstream member 102 is generally cylindrical and has a first or outer end 102A that defines the first end of flow meter 20, a second or inner end 102B, a central bore or fluid passageway 104 defined by a generally cylindrical inner surface 106 extending between ends 102A and 102B, and a generally cylindrical outer surface 108 extending between ends 102A and 102B. Upstream member 102 includes an annular first flange 110A extending radially from outer surface 108 and disposed at outer end 102A of upstream member 102 for providing a releasable or removable connection with a corresponding flange of the upstream section 12A of the pipe 12 shown in FIG. 1. Additionally, upstream member 102 includes an annular second flange 110B extending radially from outer surface 108 and disposed at inner end 102B of upstream member 102 for providing a releasable connection with a corresponding flange of first throat member 160.

In the embodiment shown in FIG. 2, bore 104 of upstream member 102 includes an upstream cylindrical section or bore 112 extending axially between outer end 102A and a transition point 114, and an upstream tapered or conical section or bore 116 extending between transition point 114 and the inner end 102B of upstream member 102. In this arrangement, an inner diameter $D_{104}$ of bore 104 is generally consistent moving axially between outer end 102A and transition point 114, but reduces in size moving axially from transition point 114 to inner end 102B of upstream member 102. Further, in the embodiment shown in FIG. 2, an outer diameter of outer surface 108 correspondingly decreases in concert with the decrease in the $D_{104}$ of inner surface 106 moving axially between transition point 114 and the inner end 102B; however, in other embodiments, the outer diameter of outer surface 108 may remain constant moving axially between point 114 and inner end 102B. In this embodiment, the diameter $D_{104}$ of bore 104 is at a maximum in upstream cylindrical section 112 and at a minimum at the terminal end (i.e., at inner end 102B) of upstream tapered section 116. The inner surface 106 defining the upstream tapered section 116 of bore 104 is disposed at an upstream taper angle α. In the embodiment shown in FIG. 2, upstream taper angle α is between 20°-25°; however, in other embodiments, upstream taper angle α may comprise varying angles. In this arrangement, tapered section 116 of the bore 104 of upstream member 102 forms a converging section configured to increase the velocity of a fluid flow (e.g., fluid flow 14 shown in FIG. 1) passing therethrough and thereby decrease the fluid pressure of the flowing fluid.

In the embodiment shown in FIG. 2, upstream member 102 includes a plurality of circumferentially spaced and radially extending upstream ports 118 disposed axially between outer end 102A and transition point 114. Upstream ports 118 provide fluid communication between the upstream cylindrical section 112 of bore 104 and an upstream pressure sensor (not shown) of the electronics assembly 40 shown in FIG. 1. In this configuration, the upstream pressure sensor of electronic assembly 40 may provide a real-time measurement of fluid pressure within cylindrical section 112 of the bore 104 of upstream member 102. Additionally, in the embodiment shown in FIG. 2, the inner end 102B of upstream member 102 comprises an annular upstream conical or angled engagement surface 120 configured to receive a corresponding surface of first throat member 160 and thereby axially align upstream member 102 with first throat member 160 (i.e., align upstream member 102 and first throat member 160 about central axis 15) when body assembly 100 is disposed in an assembled configuration. Upstream engagement surface 120 of upstream member 102 includes an annular groove 122 extending therein configured to receive an annular seal for providing sealing engagement between upstream member 102 and first throat member 160.

In the embodiment shown in FIG. 2, downstream member 130 of flow meter body assembly 100 is generally cylindrical and has a first or outer end 130A that defines the second end of flow meter 20, a second or inner end 130B, a central bore or fluid passageway 132 defined by a generally cylindrical inner surface 134 extending between ends 130A and 130B, and a generally cylindrical outer surface 136 extending between ends 130A and 130B. Downstream member 130 also includes an annular first flange 138A extending radially from outer surface 136 and disposed at outer end 130A of downstream member 130 for providing a releasable connection with a corresponding flange of the downstream section 12B of the pipe 12 shown in FIG. 1. Additionally, downstream member 130 includes an annular second flange 138B extending radially from outer surface 136 and disposed at inner end 130B of downstream member 130 for providing a releasable connection with a corresponding flange of first throat member 160.

In the embodiment shown in FIG. 2, bore 132 of downstream member 130 includes a downstream cylindrical section or bore 140 extending axially between outer end 130A and a transition point 142, and a downstream tapered or conical section or bore 144 extending between transition point 142 and the inner end 130B of downstream member 130. In this arrangement, an inner diameter $D_{132}$ of bore 132 is generally consistent moving axially between outer end 130A and transition point 142, but reduces in size moving axially from transition point 142 to inner end 130B of downstream member 130. In this embodiment, the diameter $D_{132}$ of bore 132 is at a minimum in downstream cylindrical section 140 and at a minimum at the terminal end (i.e., at inner end 130B) of downstream tapered section 144. Further, in the embodiment shown in FIG. 2, an outer diameter of outer surface 136 correspondingly decreases in concert with the decrease in the $D_{132}$ of bore 132 moving axially between transition point 142 and the inner end 130B; however, in other embodiments, the outer diameter of outer surface 136 may remain constant moving axially between point 142 and inner end 130B. The inner surface 134 defining the downstream tapered section 144 of bore 132 is disposed at a downstream taper angle β. In the embodiment shown in FIG. 2, downstream taper angle β is between 10°-15°; however, in other embodiments, downstream taper angle β may comprise varying angles. In this arrangement, tapered section 144 of the bore 132 of downstream member 130 forms a diverging section configured to decrease the velocity of a fluid flow (e.g., fluid flow 14 shown in FIG. 1) passing therethrough and thereby increase the fluid pressure of the flowing fluid.

In the embodiment shown in FIG. 2, the inner end 130B of downstream member 130 comprises an annular downstream conical or angled engagement surface 146 configured to receive a corresponding surface of first throat member 160 and thereby axially align downstream member 130 with first throat member 160 (i.e., align downstream member 130 and first throat member 160 about central axis 15) when body assembly 100 is disposed in the assembled configuration. Downstream engagement surface 146 of downstream member 130 includes an annular groove 148 extending therein configured to receive an annular seal for providing sealing engagement between downstream member 130 and first throat member 160.

First throat member 160 of flow meter body assembly 100 is generally cylindrical and has a first end 160A, a second end 160B, a central bore or fluid passageway 162 defined by a generally cylindrical inner surface 164 extending between ends 160A and 160B, and a generally cylindrical outer surface 166 extending between ends 160A and 160B. First throat member 160 includes an annular first flange 168A extending radially from outer surface 166 and disposed at first end 160A of first throat member 160 for providing a releasable connection with the second flange 110B of upstream member 102. Additionally, first throat member 160 includes an annular second flange 168B extending radially from outer surface 166 and disposed at second end 160B of first throat member 160 for providing a releasable connection with the second flange 130B of downstream member 130.

In the embodiment shown in FIG. 2, bore 162 of first throat member 160 includes an upstream tapered or conical section or bore 170A extending axially between first end 160A and an upstream transition point 172A, a generally cylindrical section or bore 174 extending between upstream transition point 172A and a downstream transition point 172B, and a downstream tapered or conical section or bore 170B extending between downstream transition point 172B and the second end 160B of first throat member 160. In this arrangement, an inner diameter $D_{162}$ of bore 162 reduces in size moving axially from first end 160A to upstream transition point 172A, remains substantially consistent moving axially between transition points 172A and 172B, and increases in size moving axially from downstream transition point 172B to second end 160B. In this embodiment, the diameter $D_{162}$ of bore 162 is at a minimum in cylindrical section 174. In the embodiment shown in FIG. 2, the inner surface 164 defining the upstream tapered section 170A of bore 162 is disposed at the upstream taper angle α while the portion defining downstream tapered section 170B is disposed at the downstream taper angle β.

In the embodiment shown in FIG. 2, first throat member 160 includes a plurality of circumferentially spaced and radially extending throat ports 176 disposed axially between transition points 172A and 172B. Throat ports 176 provide fluid communication between the throat cylindrical section 174 of bore 162 and a throat pressure sensor (not shown) of the electronics assembly 40 shown in FIG. 1. In this configuration, the throat pressure sensor of electronic assembly 40 may provide a real-time measurement of fluid pressure within cylindrical section 174 of first throat member 160. Additionally, in the embodiment shown in FIG. 2, the first end 160A of first throat member 160 comprises a first annular throat conical or angled engagement surface 178A configured to be inserted axially into the corresponding engagement surface 120 of upstream member 102 and thereby axially align first throat member 160 with upstream member 102 (i.e., align first throat member 160 and upstream member 102 about central axis 15) when body assembly 100 is disposed in an assembled configuration. Similarly, the second end 160B of first throat member 160 comprises a second annular throat conical or angled engagement surface 178B configured to be inserted axially into the corresponding engagement surface 146 of downstream member 130 and thereby axially align first throat member 160 with downstream member 130.

Additionally, first engagement surface 178A includes a first annular groove 180A extending therein while second engagement surface 178B includes a second annular groove 180B extending therein, each configured to receive an annular seal for providing sealing engagement against corresponding engagement surfaces 120 and 146, respectively. The angled or conical engagement interface provided between engagement surface 120 of upstream member 102 and first engagement surface 178A of first throat member 160 when body assembly 100 is in the assembled configuration provides for a substantially seamless coupling interface between upstream member 102A and first throat member 160, thereby minimizing disturbances in the fluid flow passing through body assembly 100 of flow meter 20. Similarly, the angled or conical engagement interface provided between engagement surface 146 of downstream member 130 and second engagement surface 178B of first throat member 160 provides for a substantially seamless coupling interface between first throat member 160 and downstream member 130.

Referring to FIGS. 2 and 3, flow meter body assembly 100 includes a first beta ratio corresponding to the inner diameter $D_{162}$ of the cylindrical bore 174 of first throat member 160 (i.e., the minimum inner diameter $D_{162}$) divided by the inner diameter $D_{104}$ of the cylindrical bore 112 of upstream member 102 (i.e., the maximum diameter $D_{104}$). In this embodiment, the accuracy of flow meter 20 in determining the rate of fluid flow therethrough (e.g., the rate of fluid flow 14 shown in FIG. 1) is dependent upon the first beta ratio of flow meter body assembly 100, such that the accuracy of the fluid flow measurement provided by flow meter 20 deteriorates as the fluid flow rate deviates from a predetermined range to which the first beta ratio is tuned. In the embodiment shown in FIGS. 2 and 3, first throat member 160 of body assembly 100 comprises a replaceable or interchange first throat member 160 that may be swapped for a different throat member having a different inner diameter, thereby providing body assembly 100 and flow meter 20 with a different or second beta ratio that varies from the first beta ratio. In this manner, the beta ratio of body assembly 100 and flow meter 20 may be varied to allow flow meter 20 to accurately measure a wider range of fluid flow rates therethrough compared to a flow meter having a single or fixed beta ratio.

Particularly, as shown in the embodiment of FIG. 3, an alternative or second throat member 190 for use with flow meter body assembly 100 in lieu of first throat member 160 is shown. Because first throat member 160 is releasably coupled with upstream member 102 and downstream member 130, first throat member 160 may be uncoupled from members 102 and 160, removed from body assembly 100, and replaced with second throat member 190. Second throat member 190 has features in common with first throat member 160, and shared features are labeled similarly. In the embodiment shown in FIG. 3, second throat member 190 is generally cylindrical and has a first end 190A, a second end 190B, and a central bore or fluid passageway 192 defined by a generally cylindrical inner surface 194 extending between ends 190A and 190B.

In the embodiment shown in FIG. 3, bore 192 of second throat member 190 includes an upstream tapered or conical section or bore 196A extending axially between first end 190A and an upstream transition point 198A, a generally cylindrical section or bore 200 extending between upstream transition point 198A and a downstream transition point 198B, and a downstream tapered or conical section or bore 196B extending between downstream transition point 198B and the second end 190B of first throat member 190. In this arrangement, an inner diameter $D_{192}$ of bore 192 reduces in size moving axially from first end 190A to upstream transition point 198A, remains substantially consistent moving axially between transition points 198A and 198B, and increases in size moving axially from downstream transition point 198B to second end 190B. In this embodiment, the diameter $D_{192}$ of bore 192 is at a minimum in cylindrical section 200. In the embodiment shown in FIG. 3, the inner surface 194 defining the upstream tapered section 196A of bore 192 is disposed at the upstream taper angle α while the portion defining downstream tapered section 170B is disposed at the downstream taper angle β.

The inner diameter $D_{192}$ of the cylindrical bore 200 of second throat member 190 is reduced in size compared to the inner diameter $D_{162}$ of the cylindrical bore 174 of first throat member 160. Thus, by installing second throat member 190 in body assembly 100 in lieu of first throat member 100 the beta ratio of body assembly 100 and flow meter 20 may be altered from a first beta ratio configured to accurately measure fluid flow rates within a first fluid flow rate range to a second beta ratio configured to accurately measure fluid flow rates within a second fluid flow rate range different from the first fluid flow rate range, where the second beta ratio corresponds to the inner diameter $D_{192}$ of the cylindrical bore 200 of second throat member 190 (i.e., the minimum inner diameter $D_{192}$) divided by the inner diameter $D_{104}$ of the cylindrical bore 112 of upstream member 102 (i.e., the maximum diameter $D_{104}$). While flow meter 20 may measure a fluid flow rate within the second fluid flow rate range while provided with the first beta ratio, the accuracy of such measurement may be reduced. Thus, by swapping between first throat member 160 and second throat member 190, flow meter body assembly 100 and flow meter 20 are configured to accurately measure a plurality of fluid flow rate ranges, either overlapping or non-overlapping, thereby increasing the flexibility and overall functionality of the flow meter 20. For instance, instead of needing to purchase two complete flow meter body assemblies for accurately measuring fluid flows in two fluid flow rate ranges, a user of flow meter 20 may purchase only a single upstream member 102 and a single downstream member 130, where throat members 160 and 190 may be swapped to allow meter 20 to accurately measure fluid flow rates in multiple fluid flow rate ranges. Although the inner diameter $D_{192}$ of the cylindrical bore 200 of second throat member 190 is reduced in size compared to the inner diameter $D_{162}$ of the cylindrical bore 174, second throat member 190 includes the angled engagement surfaces 178A and 178B included in first throat member 160, allowing second throat member 190 to releasably couple with upstream member 102 and downstream member 130 of body assembly 100.

Figure 4:
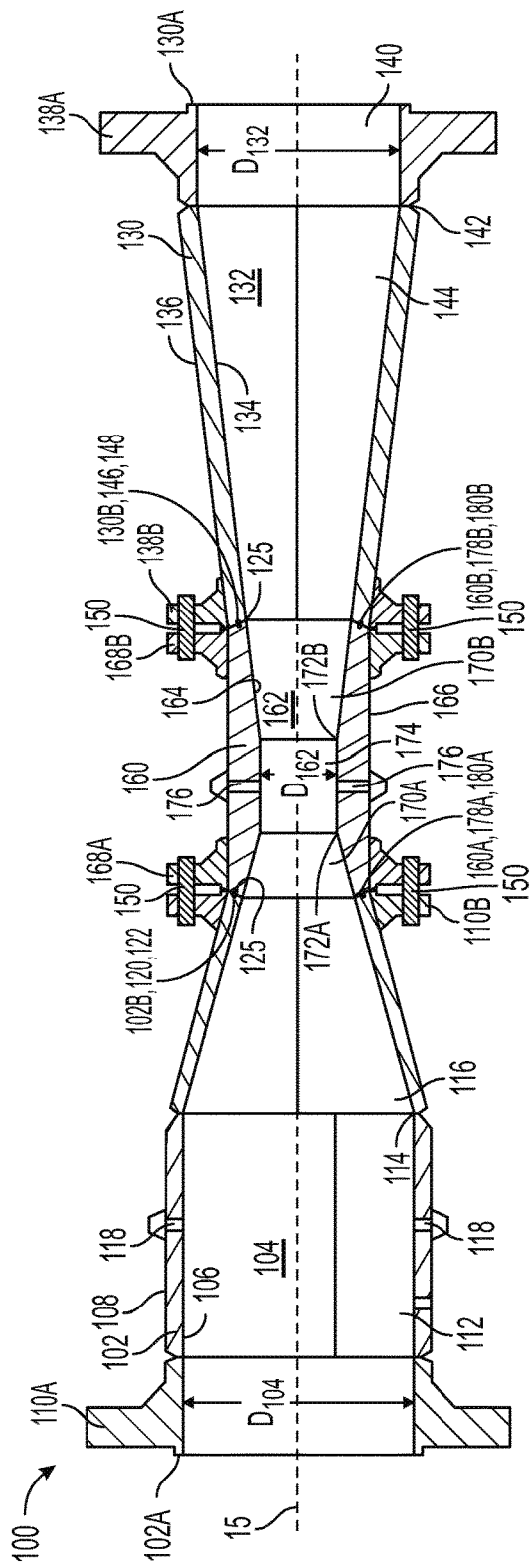
FIG. 4 is a cross-sectional view of the flow meter body assembly of FIG. 1 shown in an assembled configuration in accordance with principles disclosed herein.
Figure 7:
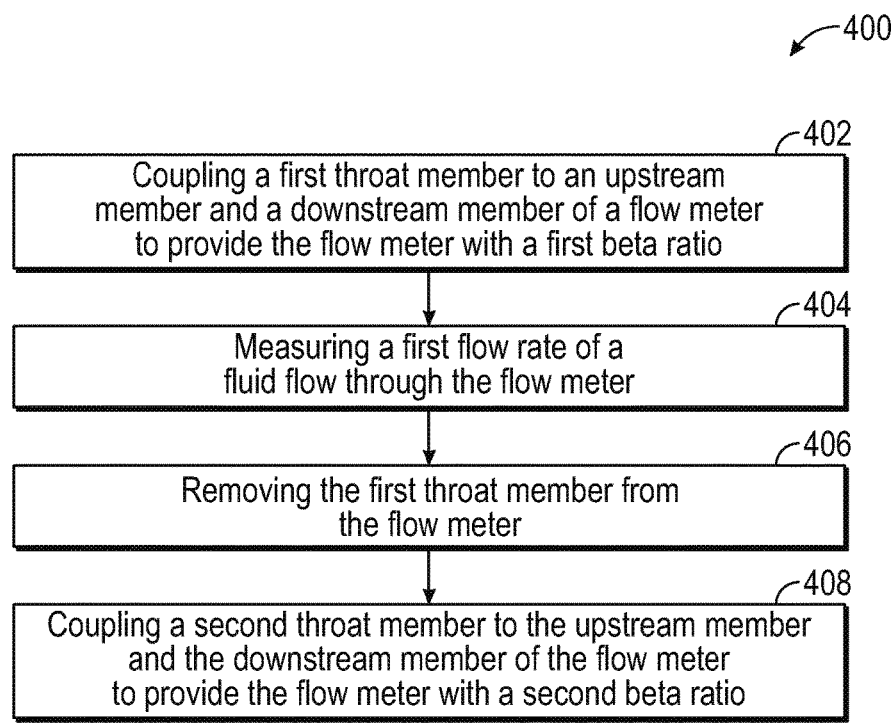
FIG. 7 is a flow chart illustrating an embodiment of a method of measuring a flow rate of a fluid flow using a flow meter in accordance with principles disclosed herein.

Referring briefly to FIG. 4, body assembly 100, including first throat member 160, of flow meter 20 is shown in the assembled configuration. In the assembled configuration of body assembly 100 the first engagement surface 178A of first throat member 160 is inserted into upstream member 102 such that engagement surface 178A is disposed directly adjacent or physically engages engagement surface 120 of member 102, thereby axially aligning upstream member 102 with first throat member 160. Additionally, the second engagement surface 178B of first throat member 160 is inserted into downstream member 130 such that engagement surface 178B is disposed directly adjacent engagement surface 146 of member 130, thereby axially aligning first throat member 160 with downstream member 130. Further, a pair of annular seals 125 are positioned axially between the components of body assembly 100 to seal the bore of assembly 100 and flow meter 20. Particularly, a first seal 125 is positioned within the groove 122 of upstream member 102 and the first annular groove 180A of first throat member 180 to seal the interface between members 102 and 160, and a second seal 125 is positioned within the second groove 180B of first throat member 160 and the groove 148 of downstream member 130 to seal the interface between members 160 and 130.

In the embodiment shown in FIG. 4, a first plurality of circumferentially spaced threaded fasteners 150 extend between apertures disposed in the second flange 110B of upstream member 102 and corresponding apertures disposed in the first flange 168 of first throat member 160, thereby releasably coupling or securing upstream member 102 to first throat member 160. Further, a second plurality of circumferentially spaced threaded fasteners 150 extend between apertures disposed in the second flange 168B of first throat member 160 and corresponding apertures disposed in the second flange 138B of downstream member 130, thereby releasably coupling or securing first throat member 160 to downstream member 130. Although second throat member 190 is not shown coupled with upstream member 102 and downstream member 130 in FIG. 4, second throat member 190 may be releasably coupled with members 102 and 130 in a similar manner. Further, although flow meter body assembly 100 is shown in FIG. 4 as being coupled via threaded fasteners 150, in other embodiments, the components of assembly 100 may be releasably coupled together using other mechanisms known in the art.

Referring to FIG. 5, another embodiment of a flow meter body assembly 300 for use with the flow meter 20 of FIG. 1 is shown. Body assembly 300 includes features in common with body assembly 100 shown in FIGS. 2-4, and shared features are labeled similarly. Flow meter body assembly 300 generally includes an upstream member 302 including a first or outer end 302A and a second or inner end 302B, a downstream member 320B including a first or outer end 320A and a second or inner end 320B, and a first throat member 340 including a first end 340A and a second end 340B.

In the embodiment shown in FIG. 5, instead of including angled or conical engagement surfaces as described with respect to body assembly 100, the components of body assembly 300 include annular planar engagement surfaces. Particularly, the inner end 302B of upstream member 302 includes an annular, planar engagement surface 304, and the inner end 320B of downstream member 320 includes an annular, planar engagement surface 322. Additionally, first throat member 340 includes a first annular, planar engagement surface 342A disposed at first end 340A and a second annular, planar engagement surface 342B disposed at second end 340B. Instead of using annular seals 125 positioned within the corresponding engagement surfaces of the components of the body assembly, as with body assembly 100 discussed above, body assembly 300 includes a pair of annular gaskets 315. Specifically, a first annular gasket 315 is positioned between engagement surface 304 of upstream member 302 and first engagement surface 342A of first throat member 340 to seal the interface between members 302 and 340, and a second annular gasket 315 is positioned between second engagement surface 342B of first throat member 340 and the engagement surface 322 of downstream member 320 to seal the interface between members 340 and 320.

In the embodiment shown in FIG. 5, instead of including angled or conical interface surfaces for providing axial alignment between the components of flow meter body assembly 300, assembly 300 includes axially extending alignment pins and corresponding apertures. Particularly, the inner end 302B of upstream member 302 includes a plurality of circumferentially spaced and axially extending alignment apertures 306, and the inner end 320B of downstream member 320 includes a plurality of circumferentially spaced and axially extending alignment apertures 324. Additionally, first throat member 340 includes a first plurality of circumferentially spaced and axially extending alignment pins 344A disposed at first end 340A and a second plurality of circumferentially spaced and axially extending alignment pins 344B disposed at the second end 340B of member 340. First alignment pins 344A of first throat member 340 are configured to be inserted into the alignment apertures 306 of upstream member 302 to axially align upstream member 302 with first throat member 340 (i.e., align members 302 and 340 with central axis 15). Similarly, second alignment pins 344B of first throat member 340 are configured to be inserted into the alignment apertures 324 of downstream member 320 to axially align first throat member 340 with downstream member 320. As with flow meter body assembly 100 discussed above, the components of body assembly 300 may be coupled together via threaded fasteners, such as fasteners 150 shown in FIG. 4, or by other mechanisms known in the art. Although in the embodiment shown in FIG. 5 first throat member 340 includes alignment pins 344A and 344B while upstream member 302 and downstream member 320 include corresponding alignment apertures 306 and 324, respectively, in other embodiments, first throat member 340 may include alignment apertures while upstream member 302 and downstream member 320 include corresponding alignment pins.

Referring to FIGS. 5 and 6, the first throat member 340 of flow meter body assembly 300 is replaceable with a second throat member 360 shown in FIG. 6. Second throat member 360 includes a first end 360A including a first engagement surface 342A, and a second end 360B including second engagement surface 342B. Additionally, second throat member 360 includes the first plurality of alignment pins 344A disposed at first end 360A for insertion into the corresponding alignment apertures 306 of upstream member 302, and the second plurality of alignment pins 344B disposed at second end 360B for insertion into the corresponding alignment apertures 324 of downstream member 320. Similar to the flow meter assembly body 100 shown in FIGS. 2-4, first throat member 340, when installed in body assembly 300, provides assembly 300 and flow meter 20 with the first beta ratio, while second throat member 360, when installed in body assembly 300, provides assembly 300 and flow meter 20 with the second beta ratio which differs from the first beta ratio. In this manner, throat members 340 and 360 may be interchangeably swapped to provide multiple beta ratios for assembly 300 and flow meter 20, allowing flow meter 20 to accurately measure fluid flow across a plurality of flow rate ranges, both overlapping and non-overlapping.

Referring to method 7, an embodiment of a method 400 of measuring a flow rate of a fluid flow using a flow meter is shown. At block 402 of method 400, a first throat member is coupled to an upstream member and a downstream member of a flow meter to provide the flow meter with a first beta ratio. In some embodiments, block 402 includes coupling first throat member 160 to upstream member 102 and downstream member 130 of flow meter body assembly 100, as shown in FIG. 4. In some embodiments, coupling first throat member 160 to the members 102 and 130 of body assembly 100 provides a first beta ratio to the flow meter 20 shown in FIG. 1 comprising the inner diameter $D_{162}$ of cylindrical bore 174 of first throat member 160 divided by the inner diameter $D_{104}$ of the cylindrical bore 112 of upstream member 102. In certain embodiments, flow meter 20, provided with the first beta ratio by first throat member 160, is configured to accurately measure the rate of a fluid flow passing therethrough within a first fluid flow rate range.

At block 404 of method 400, a first flow rate of a fluid flow through the flow meter is measured. In certain embodiments, a first flow rate of the fluid flow 14 passing through pipe 12 and flow meter 20 shown in FIG. 1 is measured at block 404. In certain embodiments, the first flow rate measured by the flow meter 20 at block 404 is within a first fluid flow rate range. At block 406 of method 400, the first throat member is removed from the flow meter. In some embodiments, block 406 includes removing or decoupling first throat member 160 from the upstream member 102 and the downstream member 130 of flow meter body assembly 100.

At block 408 of method 400, a second throat member is coupled to the upstream member and the downstream member of the flow meter to provide the flow meter with a second beta ratio. In some embodiments, block 408 includes coupling second throat member 190, shown in FIG. 3, with the upstream member 102 and the downstream member 130 of body assembly 100. In certain embodiments, coupling second throat member 190 to the members 102 and 130 of body assembly 100 provides a second beta ratio to the flow meter 20 that comprises the inner diameter $D_{192}$ of cylindrical bore 200 of second throat member 190 divided by the inner diameter $D_{104}$ of the cylindrical bore 112 of upstream member 102. In certain embodiments, flow meter 20, provided with the second beta ratio by second throat member 190, is configured to accurately measure the rate of a fluid flow passing therethrough within a second fluid flow rate range. In some embodiments, the second fluid flow rate range varies from the first fluid flow rate range. In additional embodiments, a third throat member may be coupled to upstream member 102 and downstream member 130 of body assembly 100 to provide a third beta ratio to flow meter 20 such that meter 20 is configured to accurately measure the rate of fluid flow within a third fluid flow rate range that varies from the first and second flow rate ranges.

The above discussion is meant to be illustrative of the principles and various embodiments of the present disclosure. While certain embodiments have been shown and described, modifications thereof can be made by one skilled in the art without departing from the spirit and teachings of the disclosure. The embodiments described herein are exemplary only, and are not limiting. Accordingly, the scope of protection is not limited by the description set out above, but is only limited by the claims which follow, that scope including all equivalents of the subject matter of the claims.

What is claimed is:

1. A flow meter assembly having a longitudinal axis, the flow meter assembly comprising:
   an upstream member comprising a first end, a second end, and a fluid passageway extending between the first and second ends;
   a downstream member comprising a first end and a second end; and
   a first throat member comprising a first end, a second end, and a fluid passageway extending between the first and second ends, wherein the fluid passageway of the first throat member has a minimum diameter that is less than a minimum diameter of the fluid passageway of the upstream member;
   wherein the first end of the first throat member is configured to releasably couple to the second end of the upstream member and the second end of the first throat member is configured to releasably couple to the second end of the downstream member.

2. The flow meter assembly of claim 1, wherein, when the first throat member is releasably coupled to the upstream member and the downstream member, the flow meter assembly comprises a first beta ratio comprising the minimum diameter of the fluid passageway of the first throat member divided by a maximum diameter of the fluid passageway of the upstream member.

3. The flow meter assembly of claim 2, further comprising a second throat member configured to releasably couple to the upstream member and downstream member and comprising a first end, a second end, and a fluid passageway extending between the first and second ends, wherein the fluid passageway of the second throat member has a minimum diameter that is less than the minimum diameter of the fluid passageway of the first throat member.

4. The flow meter assembly of claim 3, wherein, when the second throat member is releasably coupled to the upstream member and the downstream member, the flow meter assembly comprises a second beta ratio comprising the minimum diameter of the fluid passageway of the second throat member divided by the maximum diameter of the fluid passageway of the upstream member, and wherein the second beta ratio is different from the first beta ratio.

5. The flow meter assembly of claim 1, wherein:
   the second end of the upstream member comprises an angled engagement surface and the first end of the first throat member comprises an angled engagement interface; and
   engagement between the engagement surface of the upstream member with the engagement surface of the first throat member is configured to axially align the upstream member with the first throat member.

6. The flow meter assembly of claim 5, wherein:
   the angled engagement surfaces of the upstream member and the first throat member each comprise conical engagement surfaces; and
   the engagement surface of the first throat member is configured to be inserted into the second end of the upstream member.

7. The flow meter assembly of claim 1, wherein:
   the first end of the first throat member comprises an annular flange;
   the second end of the upstream member comprises an annular flange; and
   the flow meter assembly further comprises a plurality of threaded fasteners extending between the flanges of the upstream member and the first throat member to couple the upstream member with the throat member.

8. A flow meter assembly having a longitudinal axis, the flow meter assembly, comprising:
   an upstream member comprising a first end, a second end, and a fluid passageway extending between the first and second ends;
   a downstream member comprising a first end and a second end; and
   a throat member comprising a first end, a second end, and a fluid passageway extending between the first and second ends, wherein the throat member is configured to provide a restriction in a fluid flow passing through the flow meter assembly;
   wherein the first end of the throat member is removably coupled to the second end of the upstream member and the second end of the throat member is removably coupled to the second end of the downstream member.

9. The flow meter assembly of claim 8, wherein the flow meter assembly comprises a first beta ratio comprising a minimum diameter of the fluid passageway of the throat member divided by a maximum diameter of the fluid passageway of the upstream member.

10. The flow meter assembly of claim 8, wherein:
    the first end of the throat member comprises an annular flange;
    the second end of the upstream member comprises an annular flange; and
    the flow meter assembly further comprises a plurality of threaded fasteners extending between the flanges of the upstream member and the throat member to couple the upstream member with the throat member.

11. The flow meter assembly of claim 8, wherein:
    the first end of the throat member comprises an alignment pin; and
    the second end of the upstream member comprises an alignment receptacle configured to receive the alignment pin of the throat member to axially align the upstream member with the throat member.

12. The flow meter assembly of claim 8, wherein:
    the second end of the upstream member comprises an engagement surface and the first end of the throat member comprises an engagement interface configured to engage the engagement surface of the upstream member; and
    the engagement surfaces of the upstream member and the throat member each comprise an annular groove configured to receive an annular seal to seal an interface between the upstream member and the throat member.

13. The flow meter assembly of claim 8, wherein:
    the second end of the upstream member comprises an engagement surface and the first end of the throat member comprises an engagement interface configured to engage the engagement surface of the upstream member; and the flow meter assembly further comprises a gasket disposed axially between the upstream member and the throat member to seal an interface between the upstream member and the throat member.

14. The flow meter assembly of claim 8, wherein the fluid passageway of the first throat member has a minimum diameter that is less than a minimum diameter of the fluid passageway of the upstream member.

15. A method of measuring a rate of fluid flow using a flow meter, comprising:
   coupling a first throat member to an upstream member of a flow meter and a downstream member of a flow meter to provide the flow meter with a first beta ratio;
   measuring a first flow rate of a fluid flow through the flow meter;
   removing the first throat member from the flow meter; and
   coupling a second throat member to the upstream member of the flow meter and the downstream member of the flow meter to provide the flow meter with a second beta ratio that is different than the first beta ratio.

16. The method of claim 15, further comprising:
   measuring a second flow rate of the fluid flow through the flow meter after the second throat member is coupled to the upstream member of the flow meter;
   wherein the first flow rate is within a first flow rate range and the second flow rate is within a second flow rate range that is different from the first flow rate range.

17. The method of claim 15, further comprising engaging an angled engagement surface of the first throat member with an angled engagement surface of the upstream member to axially align the upstream member with the first throat member.

18. The method of claim 15, further comprising extending a threaded fastener through a flange of the upstream member and a flange of the first throat member to releasably couple the upstream member with first throat member.

19. The method of claim 15, further comprising extending an alignment pin of the first throat member into an alignment aperture of the upstream member to axially align the upstream member with the first throat member.

* * * * *